United States Patent
Baldi et al.

(10) Patent No.: US 12,177,510 B1
(45) Date of Patent: Dec. 24, 2024

(54) SYSTEM, METHOD AND APPARATUS FOR IMPROVING SYNCHRONIZED, MULTI-VIEW, ONLINE VIDEO PRESENTATIONS

(71) Applicant: LiveWired, LLC, Carlsbad, CA (US)

(72) Inventors: Mark Baldi, Rancho Santa Fe, CA (US); Michael Lamb, Rancho Santa Fe, CA (US); Brett Worthington, Thousand Oaks, CA (US)

(73) Assignee: LiveWired, LLC, Carlsbad, CA (US)

( * ) Notice: Subject to any disclaimer, the term of this patent is extended or adjusted under 35 U.S.C. 154(b) by 0 days.

(21) Appl. No.: 18/761,165

(22) Filed: Jul. 1, 2024

(51) Int. Cl.
*H04N 21/40* (2011.01)
*H04N 21/218* (2011.01)
*H04N 21/234* (2011.01)
*H04N 21/431* (2011.01)

(52) U.S. Cl.
CPC ... *H04N 21/4312* (2013.01); *H04N 21/21805* (2013.01); *H04N 21/23418* (2013.01)

(58) Field of Classification Search
CPC ......... H04N 21/4312; H04N 21/21805; H04N 21/23418; H04N 21/47217; H04N 21/2187; H04N 21/2365; H04N 21/8547; H04N 21/6587; H04N 21/43072
See application file for complete search history.

(56) References Cited

U.S. PATENT DOCUMENTS

| | | | | |
|---|---|---|---|---|
| 9,159,364 B1* | 10/2015 | Matias | ................ | G11B 27/28 |
| 9,544,496 B1* | 1/2017 | Chin | ................ | G08B 13/19641 |
| 10,038,843 B2* | 7/2018 | Kitagawa | ............. | H04N 23/667 |
| 10,405,009 B2* | 9/2019 | Pasko | ................ | H04N 21/6587 |
| 2003/0197785 A1* | 10/2003 | White | ................ | H04N 21/2187 |
| | | | | 348/E7.086 |
| 2014/0152834 A1* | 6/2014 | Kosseifi | ................ | H04N 7/181 |
| | | | | 348/158 |
| 2018/0255332 A1* | 9/2018 | Heusser | ................ | H04H 20/18 |

* cited by examiner

*Primary Examiner* — Alazar Tilahun
(74) *Attorney, Agent, or Firm* — Thibault Patent Group (57) ABSTRACT

A system, method and apparatus are described for improving video production technology. A video production server receives livestream videos from spectators at live events. The video production server creates video-on-demand presentations based on the livestream video clips. The video production server may also receive natively-created video clips of live events after live events have ended. The natively-created video clips each comprise location, date and time information as metadata. When natively-created video clips are received by the video production server, each clip is associated with a particular, past live event by comparing the location, date and time information of each clip to a database of live events identified by each event's location, date and time. The video production server may then update a particular video-on-demand presentation with an associated natively-created video clip, resulting in an updated video-on-demand presentation using both livestream video clips and natively-created video clips.

18 Claims, 6 Drawing Sheets

SYSTEM, METHOD AND APPARATUS FOR IMPROVING SYNCHRONIZED, MULTI-VIEW, ONLINE VIDEO PRESENTATIONS

BACKGROUND

I. Field of Use

The present application relates to the field of online entertainment. More specifically, the present application relates to improving synchronized, multi-view, online presentations.

II. Description of the Related Art

In recent years, people have been using their mobile electronic devices, such as mobile phones, to record and livestream live events, such as concerts, sporting events, etc. Online services exist today that capture such livestream videos from different spectators at a live event and allows online viewers to watch the live event in real-time, or near real-time as an event is occurring. In some cases, the livestream videos are saved as livestream video clips and used to construct multi-view, online video presentation, i.e., video-on-demand presentations. The video-on-demand presentations are static in the sense that they do not allow a presentation to be improved after they have been created. For example, there is no way to dynamically supplement such presentations with additional video footage of the event received after a presentation has been created. Thus, traditional video production computer equipment does not have the capability to dynamically alter video-on-demand presentations once they have been created.

Further, such presentations do not use certain aspects of livestream video or video clips to enhance a viewing experience, for example, a vantage point of where a livestream video or video clip was recorded within a venue.

Furthermore, it is difficult to provide a continuous presentation of an entire event because numerous gaps in coverage usually exist, due to the length of most live events and simply not enough livestream videos streamed to cover every portion of each event.

It would be desirable to improve such multi-view, online presentations to allow dynamic modifications of such presentations after they have been created, to use vantage point information to improve presentations, and to reduce or eliminate gaps in coverage of events in the presentations.

SUMMARY

The embodiments described herein relate to a system, method and apparatus for improving synchronized, multi-view, online presentations. In one embodiment, a method is described, executed by an online video production server, comprising creating an online video-on-demand presentation of a past, live event, comprising a plurality of livestream video clips of the past, live event received while the past, live event occurred, the plurality of livestream video clips derived from a plurality of livestream videos livestreamed by a livestream app executed by a plurality of content capture devices, after creating the online video-on-demand presentation, receiving a natively-recorded video clip from a spectator who was present at the past, live event, the natively-recorded video clip created by native functionality of a first content capture device, determining that the natively-recorded video clip is associated with the past, live event, selecting a first video-on-demand presentation from a plurality of existing video-on-demand presentations associated with the past, live event and merging the natively-recorded video clip with the first video-on-demand presentation when the natively-recorded video clip is associated with the past, live event, resulting in an first updated video-on-demand presentation comprising both the livestream video clips and the natively-recorded video clip.

In another embodiment, a system is described for improving synchronized, multi-view, online presentations. The system comprises a plurality of content capture devices configured to create natively-recorded video clips of a live event, each natively-recorded video clip created by native functionality of the first content capture device, each of the natively-recorded video clips comprising a natively-generated location and a natively-generated time when each natively-recorded video clip was recorded, to execute a livestream app configured to stream livestream videos of the live event to the video production server and further configured to enable a user to select a first natively-recorded video clip and upload the first natively-recorded video clip to the video production server, and the video production server configured to create online video-on-demand presentations of a plurality of live events, including a first video-on-demand presentation based on the live event, the video-on-demand presentation comprising a plurality livestream video clips created from the livestream videos of the live event, to determine that a first natively-recorded video clip is associated with the live event, to determine an association between the first natively-recorded video clip and the live event, and to merge the first natively-recorded video clip with the first video-on-demand presentation when the first natively-recorded video clip is associated with the live event, resulting in an updated video-on-demand presentation comprising both the livestream video clips and the first natively-recorded video clip.

BRIEF DESCRIPTION OF THE DRA WINGS

The features, advantages, and objects of the present invention will become more apparent from the detailed description as set forth below, when taken in conjunction with the drawings in which like referenced characters identify correspondingly throughout, and wherein.

DETAILED DESCRIPTION

Embodiments of the present invention are associated with improvements to video-on-demand production and presentation technology. Presently, there is no way to dynamically alter video-on-demand presentations produced from a plurality of livestream videos received from a plurality of spectators at live events, once these video-on-demand presentations have been created. Embodiments of the present invention address this deficiency in the prior art by combining livestream video clips of a live event with natively-recorded video clips of the event received after an event has ended. Further, embodiments of the present invention combine such livestream video and natively-recorded video clips in a way that reduces or eliminates gaps in coverage of a live event and, further, combines these videos based on a vantage point of where each video was taken at a venue.

The present description describes various embodiments of systems, methods and apparatus for improving video production technology for creating synchronized, multi-view, online presentations. Spectators at live events stream livestream video of the events to an online video production server, where they are saved as livestream video clips and organized by event. A video-on-demand presentation is generated for each event, each video-on-demand presentation comprising livestream video clips associated with each event. The online video production server receives additional video clips of each live event after each event has ended from spectators who attended each live event. These additional video clips may be created by native functionality of each spectator's "content capture device", i.e., mobile phone, to create "natively-recorded video clips". The natively-recorded video clips comprise metadata, which is used by the online video production server to match each natively-recorded video clip to a particular live event, where they are then added to a video-on-demand presentation comprising livestream video clips associated with the same event. In one embodiment, the online video production server may merge natively-recorded video clips with the previously-received livestream video clips, so that a seamless presentation of an event may be created. "Live events" may comprise concerts, sporting events, social events such as weddings, parties, graduations, etc., or other events performed by living persons, and oftentimes viewed by large numbers of spectators at the time that an event is occurring.

The online video production server may automatically determine which event a particular natively-recorded video clip is associated with and adds the natively-recorded video clip to an existing video-on-demand presentation. In some embodiments, the online video production server adds a natively-recorded video clip to an existing video-on-demand presentation when a gap in coverage of the live event is present in the video-on-demand presentation. In other embodiments, a natively-recorded video clip is added to an existing video-on-demand presentation when a gap in coverage from a particular vantage point exists in the video-on-demand presentation. In yet other embodiments, a livestream video clip or a natively-recorded video clip of a portion of a live event may be replaced in a video-on-demand presentation by a newly-received, natively-recorded video clip recorded at the event of approximately the same portion of the event, when a quality of the newly-received natively-recorded video clip exceeds a quality of the existing livestream video clip or existing natively-recorded video clip.

Figure 1:
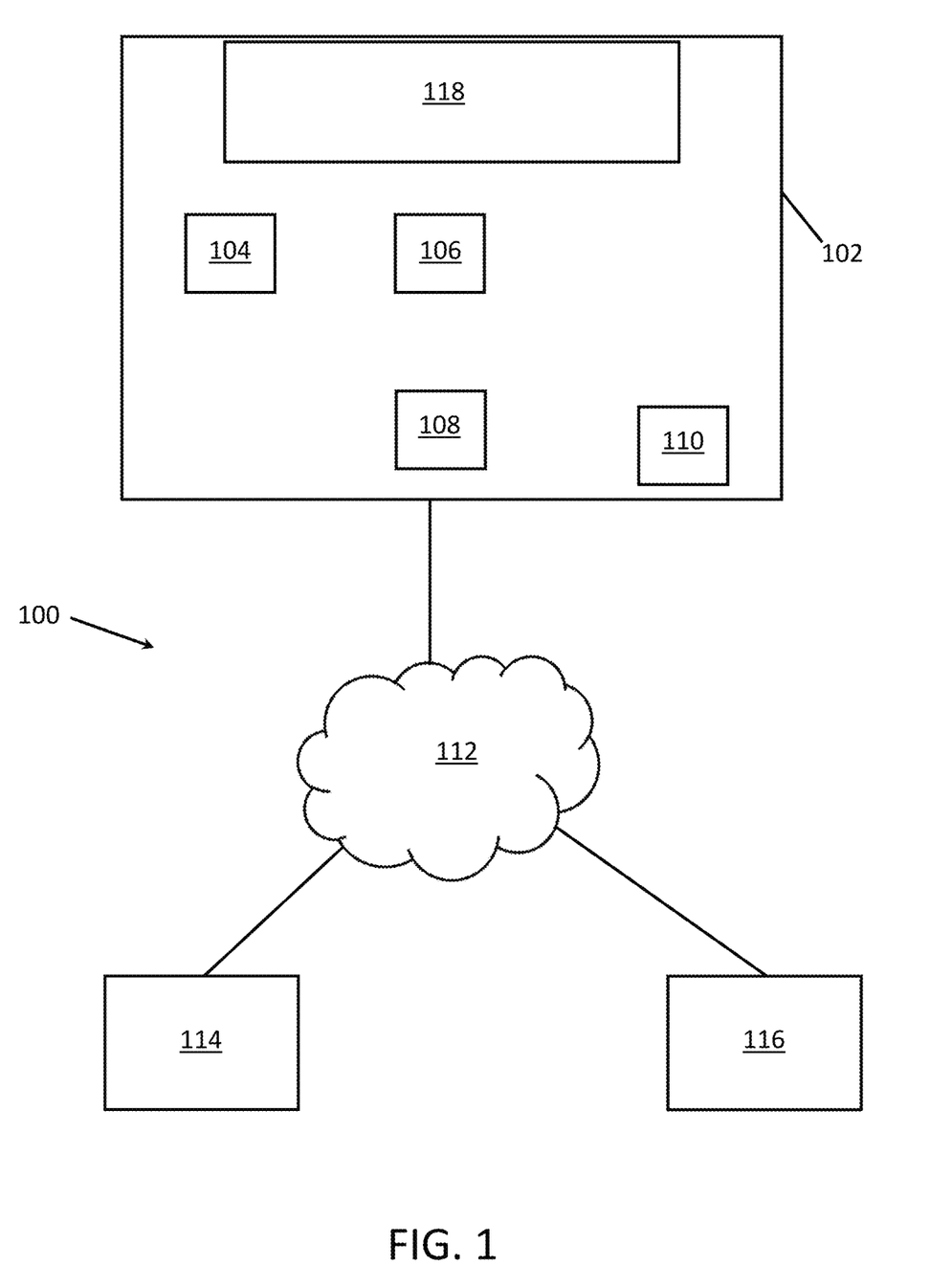
FIG. 1 is a block diagram of a system for updating synchronized, multi-view, online presentations.

FIG. 1 is a block diagram of a system 100 for updating synchronized, multi-view, online video-on-demand presentations. Shown is venue 102, content capture devices 104, 106, 108 and 110, wide-area network 112, video production server 114 and content consumption device 116.

Venue 102 hosts live events, such as concerts, sporting events, plays, or social events such as parties, weddings, graduations, etc., or some other event typically viewed by a large number of spectators. A "live" event refers to living persons participating in event, such as musicians, sports players, actors, partygoers, wedding parties, graduates, etc. It should be understood that reference to a live event in progress or a live event that has ended may each be referred to herein as a live event, or simply, an "event" and will be obvious by the context in which each term is used to distinguish between live events in progress or live events that have ended.

Video production server 114 receives livestream videos streamed from spectators during live events and may provide the livestream videos in real-time or near real-time online in a "livestream presentation". The term "livestream video" as used here in refers to a streaming video or feed of a live event in real or near-real time. For each event, after an event has ended, video production server 114 may store livestream videos associated with an event as "livestream video clips", in association with a particular event and supplemental information regarding each livestream video, such as an event name, event location, date and time of the event, a vantage point where each livestream video clip was taken, a name of a spectator who provided each livestream video clip, etc. Video production server 114 may then create a video-on-demand presentation in association with each event based on livestream videos received during each event. An existing video-on-demand presentation comprising only livestream video clips may be improved by supplementing it with natively-recorded video clips recorded by spectators at the live event using native functionality of their content capture devices, and integrate these natively-recorded video clips into the video-on-demand presentation, resulting in an improved video-on-demand presentation.

In order to stream live video from a live event and, in some cases, upload natively-recorded video clips of the live event after the event has ended, spectators may download a livestream video recording and transmission application for execution on each spectator's "content capture device". A content capture device as used herein comprises a mobile phone, a network-capable still or video camera, a wearable device, etc. The livestream video recorder and transmission application, herein referred to as a "livestream" app", allows spectators to register and create an account with video production server 114 in order to livestream video of the live event as the live event occurs and, in some embodiments, to upload natively-recorded video clips of the live event after the live event has ended. The livestream app may also allow spectators to enter or confirm information about the live event, such as a name of an event (i.e., Lady Gaga concert, Jan and John's wedding, baseball game between the Reds and the Cardinals, etc.), a name of venue 102 (i.e., Dodger Stadium, Del Mar Fairgrounds, etc.), a seat or section location of the person at venue 102, and/or a predetermined vantage point at venue 102 (such as "pit", "upper level", "mezzanine", etc.). After entering or confirming information about a live event, a spectator may be given permission from video production server 114 to transmit livestream video of the event via the livestream app. The spectator may then stream livestream video using the livestream app and to video production server 114 via wide-area network 112.

Spectators at a live event may arrive at venue 102 before or during the event. Most spectators carry a respective content capture device. In FIG. 1, while only 4 content capture devices are shown, in actuality, live events may draw many hundreds or thousands of spectators, most carrying their own content capture device.

In many cases, more than one content capture device will simultaneously transmit overlapping livestream videos of a portion of a live event. For example, each of the content capture devices 102 through 110 in FIG. 1 may each substantially simultaneously stream a livestream video to video production server 114, each of the livestream videos capturing, for example, a popular guitar solo during a concert. Each of these livestream videos may vary in duration from each other, as well as start and stop times, each livestream video particular to a location, or vantage point, of each content capture device inside venue 102. For example, content capture device 110 is situated, in this example, far away from stage 118 and offset from the center of stage 118, to the right, while content capture device 106 is located near stage 118 and center stage. Due to the different locations of each content capture device, livestream video transmitted by each device will be different with respect to a view or vantage point of each device and, typically, audio quality. Thus, each of the content capture devices shown in FIG. 1 may transmit livestream video of the same live event at the same or different times, at the same or different durations, at different vantage points, with differing audio quality depending on location.

During the live event, video production server 114 receives livestream videos from the content capture devices located at venue 102, as well as other livestream videos that may be received from content capture devices worldwide at different live events, via wide-area network 112. Wide-area network 112 comprises one or more communication networks, enabling the content capture devices to communicate with video production server 114. Examples of wide-area network 112 comprise the Internet, a cellular mobile phone network, a satellite communication network, etc.

When livestream videos are received by video production server 114, video production server 114 may identify the sender of each livestream video based on an identifier of the spectator, a location of the spectator, a particular content capture device and/or an identification code transmitted along with any livestream video. Video production server 114 may receive a number of livestream videos from content capture devices both at venue 102 as well as from other content capture devices anywhere in the world. Upon receiving a livestream video, video production server 114 may associate the livestream video with a particular live event occurring as the livestream video is received, based on, for example, by comparing a location of a content capture device is steaming livestream video to known locations where live events are occurring. For example, if video production server 114 receives three livestream videos, one from content capture device 108, another from content capture device 104 and another from a content capture device at a venue different from venue 102, video production server 114 may associate the livestream videos provided by content capture device 104 and 102 with a first live event occurring at venue 102 based on location information associated with the livestream videos and a location of venue 102, and associate the livestream video received from the other content capture device with a second live event occurring at a different venue or location than content capture device 104 and 102, based on location information associated with the livestream videos and location of the different venue.

Figure 2:
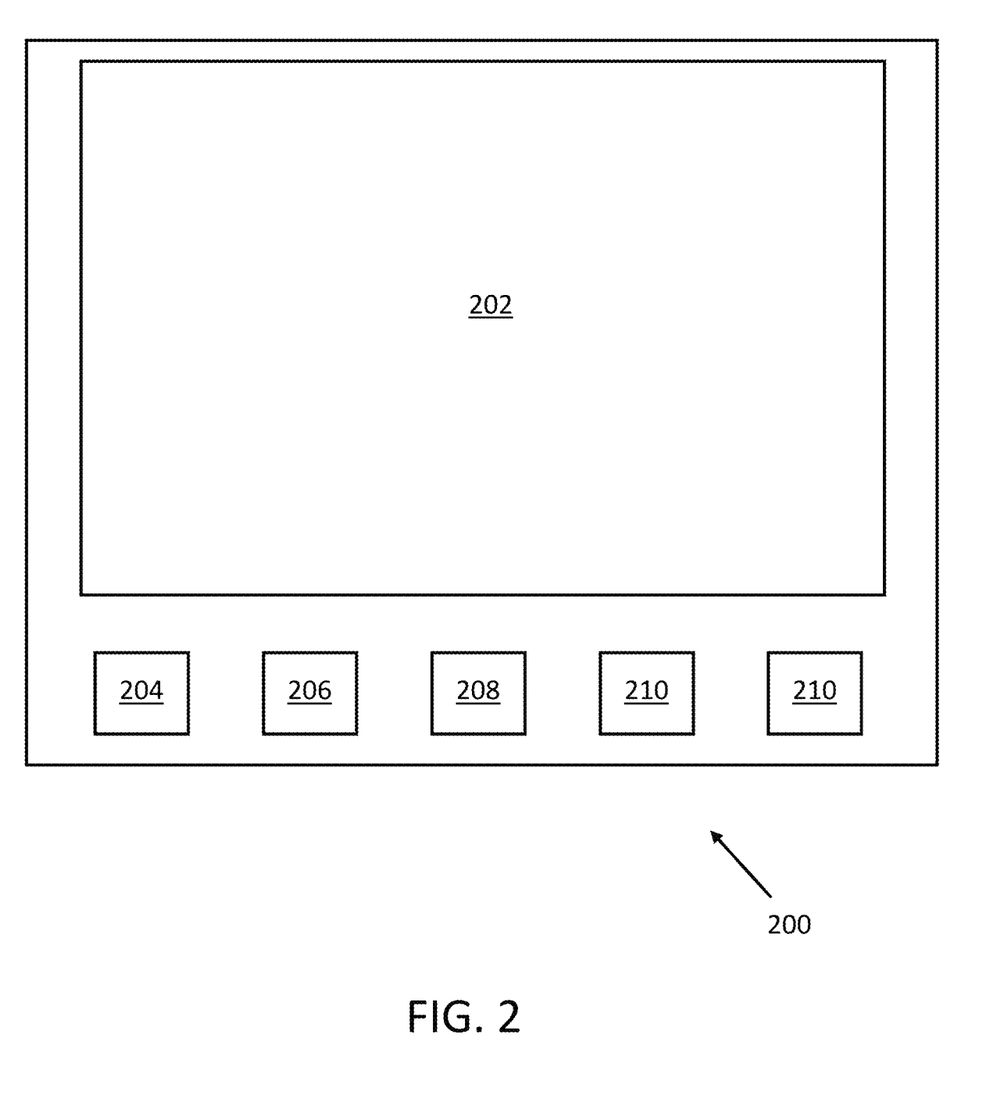
FIG. 2 is a simplified view of a portion of a content consumption device as shown in FIG. 1, i.e., a display screen showing a layout of a video-on-demand presentation.

Before or after a live event has ended, video production server 114 may create a video-on-demand presentation of the event, shown as video-on-demand presentation 200, as shown in FIG. 2. FIG. 2 illustrates a viewing screen of content consumption device 116, i.e., a personal computer, mobile phone, video monitor, etc., displaying video-on-demand presentation 200. In this embodiment, video-on-demand presentation 200 comprises a main viewing area 202 and a plurality of icons 204-212 for allowing a viewer to select different vantage points for watching an event based on livestream videos received by online video production server 114 during an event and natively-recorded video clips recorded during the event but received by online video production server 114 generally after an event has ended. As used herein, an "icon" may comprise a static representation of a particular vantage point at venue 102, such a circle, square, etc. having wording of a vantage point, such as "pit", "lower level", etc., a representative thumbnail image of a particular vantage point or a video thumbnail of a livestream video clip or natively-recorded video clip displayed as an icon, synchronized to an event as the event occurred. The latter embodiment may be particularly useful for allowing viewers of video-on-demand presentation 200 to decide which vantage point to choose for watching the event on main viewing area 202.

In other embodiments, video production server 114 may vary the number, description and placement of icons in video-on-demand presentation 200. For example, in the embodiment shown in FIG. 2, five icons are shown, located beneath main viewing area 202 and labeled as "pit" icon 204 (for viewing videos of the event from a vantage point of someone in the pit area of venue 102), "front row" icon 206 (for viewing videos of the event from a vantage point of someone in a first row of venue 102, or within a predetermined row from the first row, such as the first 3 rows), "lower-level" icon 208 (for viewing videos of the event from a vantage point of someone in a lower level of venue 102, "mid-level" icon 210 (for viewing videos of the event from a vantage point of someone in a middle level of venue 102, and "upper level" icon 208 (for viewing videos of the event from a vantage point of someone in an upper level of venue 102).

During a live event, when a spectator stops streaming a livestream video to video production server 114, video production server 114 may store the livestream video as a "livestream video clip" in a memory associated with video production server 114. Video production server 114 may save all livestream video clips of the same vent in association with each other, for creating video-on-demand presentation 200.

During or after a live event has ended, video production server 114 may receive natively-recorded video clips from spectators who were at an event. Such natively-recorded video clips are typically selected by a spectator on a respective content capture device running the livestream app from a plurality of natively-recorded video clips stored in memory of a content capture device. For example, during a live event, spectators who may not have installed the livestream app may record natively-recorded video clips of the live event, i.e., video clips of the live event using a native recording capability of a content capture device. Of course, spectators who have installed the livestream app onto their content capture devices may also record video clips using the native recording capability of their content capture devices.

"Native capability" of a content capture device typically means firmware that is embedded into an operating system of a content capture device. For example, each iPhone comes equipped with a camera and a native app that allows a user to take photographs or record video using the native app. The photographs and video are stored in memory and made available for selection and viewing by a user in a native "Photos" app. Each native photograph or video clip typically comprises "metadata" associated with each photograph or video clip, such as a location, date and time that a photograph or video was recorded. The livestream app may be used to select natively-recorded video clips of a live event, either during or after a live event has ended, and to upload selected natively-recorded video clips to video production server 114 for use in improving video-on-demand presentations. Uploading such natively-recorded video clips may occur during or immediately after a live event has ended, or days, weeks, months or even years after an event.

When a natively-recorded video clip is selected for upload to video production server 114, in one embodiment, the livestream app may evaluate the metadata associated with the selected, natively-recorded video clip, and send the metadata along with the selected natively-recorded video clip, for use by video production server 114 to identify a particular event where the natively-recorded video clip was recorded. In another embodiment, the livestream app simply transmits the natively-recorded video clip, and video production server 114 evaluates the metadata embedded in each natively-recorded video clip. In either case, in one embodiment, video production server 114 may query a spectator that sent a natively-recorded video clip to verify the name and location of the live event associated with a natively-recorded video clip.

After video production server 114 has determined which live event the natively-recorded video clip is associated with, video production server 114 evaluates an existing video-on-demand presentation associated with the event to determine whether to add the natively-recorded video clip to the video-on-demand presentation, resulting in an improved, updated video-on-demand presentation comprising livestream video clips of the event as well as natively-recorded video clips of the event. Supplementing the livestream video clips with natively-recorded video clips is desirable because in many instances, gaps in coverage may exist if not enough livestream videos were received by video production server 114 during a live event The natively-recorded video clips may reduce or eliminate these gaps in coverage, resulting in a more streamlined, complete and pleasing video-on-demand presentation.

In some embodiments, before merging a natively-recorded video clip with a video-on-demand presentation, video production server 114 may evaluate each natively-recorded video clip to determine whether it meets or exceeds one or more predefined minimum quality thresholds, such as a minimum video quality, a minimum audio quality, a minimum level of visual obstruction with stage 118, a minimum ambient crowd noise, or desirable vantage points in venue 102. For example, video production server 114 may evaluate a natively-recorded video clip to determine whether a video quality of the natively-recorded video clip meets or exceeds a predetermined video quality level. For example, video production server 114 may determine a video format, video resolution, frame rate, and/or a make and/or model of a content capture device that created the media clip, based on metadata of a natively-recorded video clip. If the natively-recorded video clip meets or exceeds a minimum, predefined level of each and/or any types of video quality levels, video production server 114 may add or merge the natively-recorded video clip to the presentation video-on-demand.

In one embodiment, natively-recorded video clips are added to a video-on-demand presentation depending on whether a gap in coverage of a live event exists at the time the natively-recorded video clip was recorded. In this embodiment, the livestream app may provide an indication to video production server 114 of a vantage point where a natively-recorded video clip was recorded. For example, after a natively-recorded video clip is selected for upload to video production server 114, a user of a content capture device may indicate, using the livestream app, that the user was at a particular live event, on a particular date, at a particular geographic location, and that the user was sitting in the second row of venue 102 when the natively recorded video clip was recorded. Video production server 114 may then determine if a gap in coverage exists in the video-on-demand presentation at the time the natively-recorded video clip was recorded. In one embodiment, a natively recorded video clip is added to the video-on-demand presentation when a gap in coverage exists at one of the predefined vantage points identified, in this example, by icons 204 through 210, at the time that the natively-recorded video clip was recorded.

Figure 3:
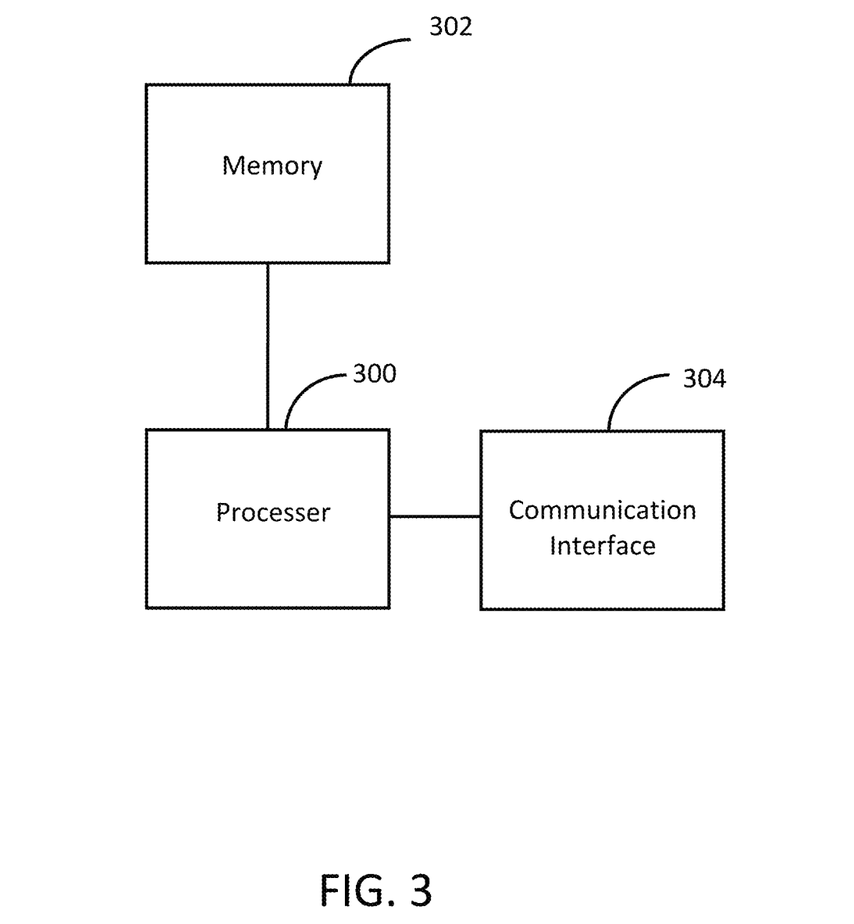
FIG. 3 is a functional block diagram of one embodiment of the online video production server as shown in FIG. 1.

FIG. 3 is a functional block diagram of one embodiment of video production server 114, showing processor 300, memory 302, and communication interface 304. It should be understood that not all of the functional blocks shown in FIG. 3 are required for operation of video production server 114 in some embodiments, that the functional blocks may be connected to one another in a variety of ways, and that not all functional blocks necessary for operation of video production server 114 are shown (such as a power supply), for purposes of clarity.

Processor 300 is configured to provide general operation of video production server 114 by executing processor-executable instructions stored in memory 302, for example, executable code. Processor 300 may comprise one of a variety of microprocessors, microcomputers, microcontrollers, SoCs, modules and/or ASICs. Processor 300 may be selected based on a variety of factors, including power-consumption, size, and cost.

Memory 302 is coupled to processor 300 and comprises one or more information storage devices, such as RAM, ROM, flash memory, or some other type of electronic, optical, or mechanical memory device(s). Memory 302 is used to store processor-executable instructions for operation of video production server 114 as well as any information used by processor 300, such as event information including time and location of each event, livestream video, video clips, and other information used by the various functionalities of video production server 114. It should be understood that memory 302 is non-transitory, i.e., it excludes propagating signals, and that memory 302 could be incorporated into processor 300, for example, when memory processor 300 is an SoC. It should also be understood that once the processor-executable instructions are loaded into memory 302 and are executed by processor 300, video production server 114 may become a specialized computer for updating synchronized, multi-view, online presentations. It should also be understood that the processor-executable instructions improve conventional video creation and production technology, because it provides a mechanism to combine livestream video clips with natively-recorded video clips in a way that reduces or eliminates gaps in coverage.

Communication interface 304 is coupled to processor 300, comprising well-known circuitry for allowing video production server 114 to communicate with content capture devices and content consumption devices via a wide-area network 112.

Figure 4A:
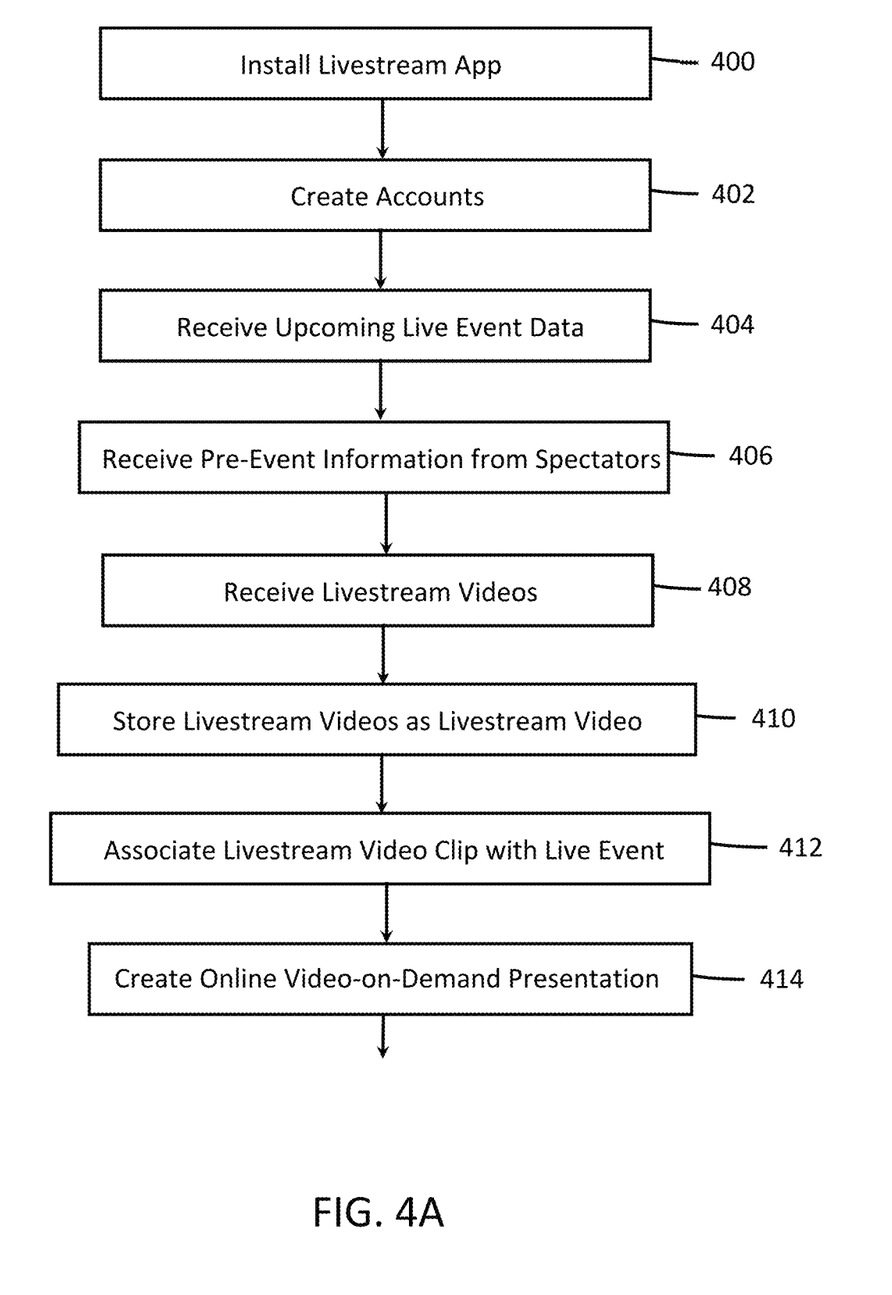
FIGS. 4A-4B represent a flow diagram of one embodiment of a method for creating and updating synchronized, multi-view, online presentations.
Figure 4B:
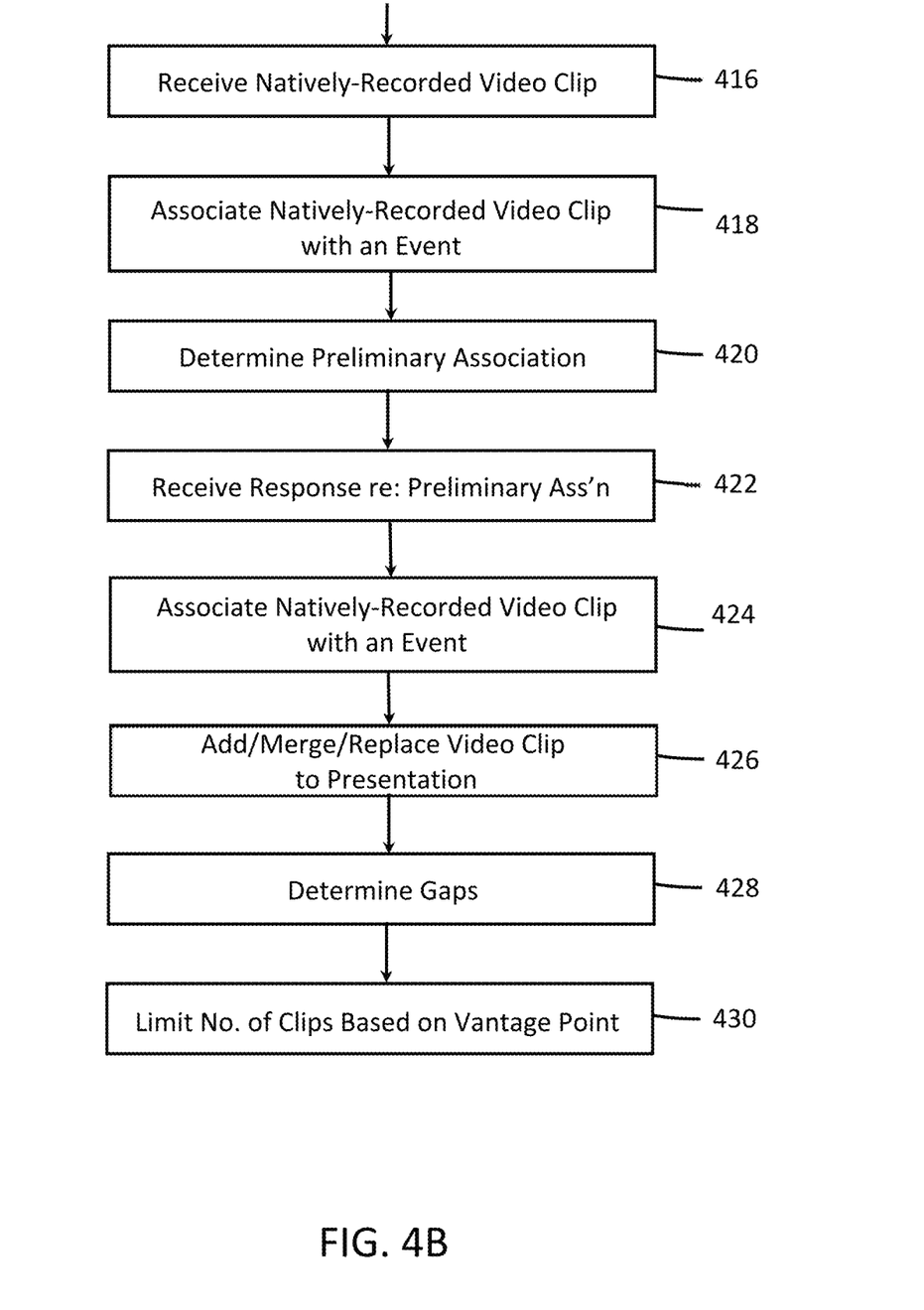

FIGS. 4A-4B represent a flow diagram illustrating one embodiment of a method for improving synchronized, multi-view online presentations. It should be understood that in some embodiments, not all of the method steps shown in FIGS. 4A and 4B are performed and that the order in which the steps are performed may be different in other embodiments. The method will be described in connection with FIGS. 1-3, referring to a particular live event occurring at venue 102.

At step 400, a livestream video recording and streaming app, i.e., the livestream app discussed earlier here, is installed onto numerous content capture devices, including content capture devices 104-110 shown in FIG. 1. The livestream app allows spectators at a live event to livestream the event, as well as to select and upload natively-recorded video clips to video production server 114 during or after the live event has ended. A spectator associated with each content capture may register with video production server 114 by creating a spectator account, as is well-known in the art, and provide account information such as a spectator name, address, password, credit card information, make and/or model of the spectator's content capture device, etc.

At step 402, processor 300 of video production server 114 creates an account for each spectator that downloaded the livestream app and registered with video production server 114. Processor 300 then stores the account information provided by the spectator in memory 302.

At step 404, processor 300 may receive event information associated with upcoming live events occurring at venues over a wide geographical area, such as in one or more cities, states, countries, or even the entire world, via communication interface 304, and store the event information in memory 302. A variety of online services may provide this information. Typically, the event information comprises an identification of an event, such as a name of an event (i.e., Lady Gaga concert, Jan and John's wedding, baseball game between the Reds and the Cardinals, etc.), a name of a venue where each event will be held (i.e., Dodger Stadium, Del Mar Fairgrounds, etc.), seating or section information of the each venue (i.e., a ranking of seats based on a vantage point of a stage, a listing of sections, such as "pit", "upper level", "mezzanine", etc.), a date, an expected start time, an expected end time and/or an expected duration of each event, etc. Processor 300 uses the event information to associate livestream videos and natively-recorded video clips to live events.

At step 406, users of content capture devices may provide event information to video production server 114 via the livestream app, in order to "pre-register" with an event. For example, a spectator before or during a concert may login to the spectator's account and enter information regarding the concert, such as a name of the concert, a venue name, a venue address, etc. so that video production server 114 can identify the concert when the spectator streams livestream videos of the concert to video production server 114 during the concert.

At step 408, during a live event, processor 300, via communication interface 304, receives livestream videos, i.e., streaming video in real-time or near real-time, from content capture devices located at venue 102, as well as other livestream videos that may be received from content capture devices worldwide at different live events, via wide-area network 112. The livestream videos are provided to video production server 114 by the livestream app operating on each content capture device, which may also provide supplemental information associated with each livestream video either before, during or after a transmission of a livestream video. The supplemental information may comprise one or more of a spectator name, spectator account, content capture ID (i.e., an IMEI), an event name, a venue name, a venue location or address, a date and time that the livestream video was taken, a vantage point of the spectator in venue 102, etc. The supplemental information may be stored by processor 300 in memory 302 for determining whether to add natively-recorded video clips to a video-on-demand presentation comprising a particular livestream video. In one embodiment, processor 300 determines supplemental information of a livestream video simply by determining a source of a livestream video, i.e., determining that a livestream video originated from a spectator that provided supplemental information to video production server 114 prior to streaming a first livestream video from an event.

At step 410, processor 300 may store livestream videos as livestream video clips (i.e., a video clip created from a livestream video) in memory 302 after each livestream video has ended. Each stored livestream video clip may be stored in association with its respective supplemental information provided by the livestream app.

At step 412, processor 300 may associate each livestream video clip to a particular live event by comparing at least some of the supplemental information associated with each livestream video clip to the event information received previously. For example, if the supplemental information indicates that a livestream video was recorded at particular GPS coordinates, processor 300 may use the particular GPS coordinates to search the event information for a live event in progress at a location substantially matching the particular GPS coordinates associated with the livestream video. When a match is found, processor 300 associates the livestream video with the live event. The video-on-demand presentation is used to allow online users to experience events online after events have ended, interactively, allowing users to select which vantage point to view an event.

At step 414, either during a live event or after a live event has ended, processor 300 may create an online video-on-demand presentation 200 of the event based on at least some of the livestream videos received from spectators during the event.

Video-on-demand presentation 200 comprises a number of livestream video clips from multiple vantage points at venue 102 from multiple spectators using their content capture devices, each executing the livestream app. Ideally, enough livestream videos are received to completely capture an entire live event, and at multiple vantage points. However, in reality, there may be gaps in coverage of a live event when no livestream video is received any content capture device at the event, or gaps in coverage of a particular vantage point. Gaps may last a few seconds or a few minutes, depending on the amount of livestream videos received during a live event. This may result in a video-on-demand presentation that lacks coherency, which may cause users online to lose interest in viewing such events via the video-on-demand presentation.

At step 416, after a live event has ended, processor 300, via communication interface 304, may receive natively-recorded video clips of the event, recorded by content capture devices at the live event using a native recording capability of a content capture device, for example, a video camera app that comes standard with all iPhones. Spectators of live events may use the livestream app described previously to select natively-recorded video clips of the live event natively saved on their content capture devices, such as from an electronic folder defined by the operating system of each content capture device for storing natively-recorded video clips. Each natively-recorded video clip may comprise natively-generated metadata such as a geographic location where the natively-recorded video clips was recorded, a date and time that the natively-recorded video clip was recorded, an identification of the content capture device (such as a make, model, serial number, etc.). In another embodiment, natively-generated metadata associated with each natively-recorded video clip is provided separately by the livestream app after the livestream app extracts such natively-generated metadata from each natively-recorded video clip selected. In any case, each natively-recorded video clip and its associated natively-generated metadata is stored in memory 302.

At step 418, processor 300 may associate each natively-recorded video clip with a particular event from the event information previously received and stored in memory 302 in step 404, based on metadata associated with each natively-recorded video clip, such as a geographic location, date and/or time information associated with each natively-recorded video clip. For example, processor 300 may compare some of the metadata associated with a natively-recorded video clip to the event information previously received to determine a match between the metadata and the event information.

At step 420, in some embodiments, processor 300 may make a preliminary association between a natively-recorded video clip and a particular live event. In these embodiments, processor 300 may cause a query to be transmitted via communication interface 304 to a spectator that provided the natively-recorded video clip, the query comprising inferred information associated with a live event potentially associated with the natively-recorded video clip. The query may ask the spectator, using the livestream app, to confirm that the natively-recorded video clip was recorded at the inferred live event. For example, the query may ask the spectator whether the natively-recorded video clip provided by the spectator originated from a Taylor Swift concert on Mar. 18, 2023 in Cleveland, Ohio.

At step 422, processor 300 may receive a response from the spectator, confirming the inferred information. Receipt of such confirmation indicates that the inferred information was correct, and that the preliminary association between the natively-recorded video clip and the particular live event was also correct.

At step 424, in any case, processor 300 associates the received, natively-recorded video clip with a particular live event and, thus, a particular video-on-demand presentation associated with the live event. In one embodiment, if no video-on-demand presentation exists in association with a particular live event when a natively-recorded video clip is received, processor 300 may create a new video-on-demand presentation associated with the live event associated with the natively-recorded video clip. For example, when processor 300 receives a natively-recorded video clip and determines, by the metadata associated with the natively-recorded video clip, that the natively-recorded video clip corresponds to a particular live event (based on the live event feed received previously), but no livestream videos were received during the particular live event, processor 300 may create a new video-on-demand presentation associated with the live event, including the natively-recorded video clip and subsequent natively-recorded video clips that may be received by processor 300 in the future.

At step 426, in one embodiment, in order to update a video-on-demand presentation, processor 300 simply adds a natively-recorded video clip to a plurality of livestream video clips of the video-on-demand presentation. Online users may then select any of the livestream video clips or the natively recorded video clip to view in the online video-on-demand presentation. Of course, when additional natively-recorded video clips are determined to be associated with the same live event, processor 300 may add those as well to the video-on-demand presentation, resulting in an updated video-on-demand presentation comprising a plurality of livestream video clips and a plurality of natively-recorded video clips.

Figure 5:
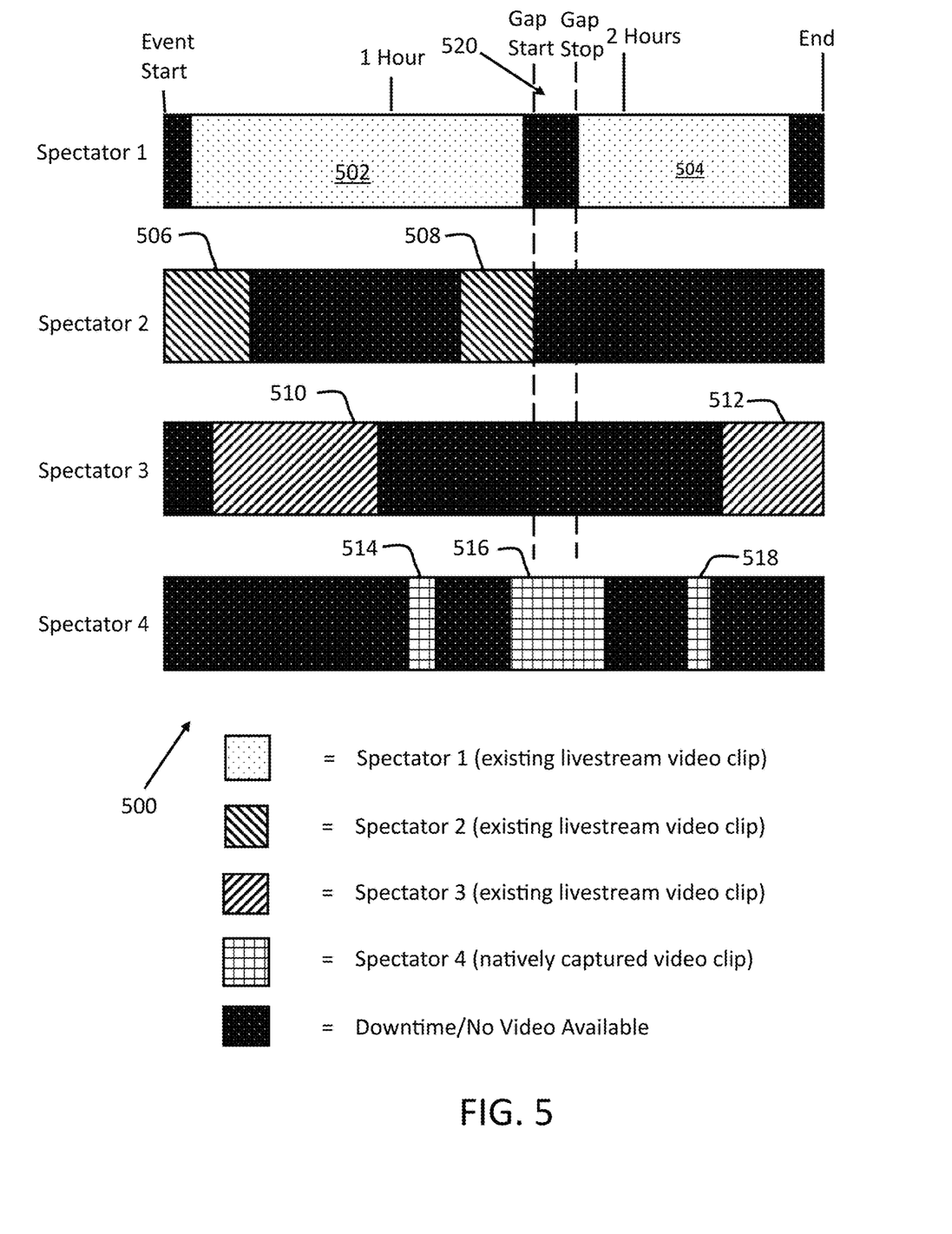
FIG. 5 shows a timeline 500 of a live event and six livestream videos received during the event from three different spectators at the live event, and three natively-recorded video clips received either during or after the event has ended.

In another embodiment, natively-recorded video clips are "merged" with one or more livestream video clips in a video-on-demand presentation when a gap in coverage of the live event exists in the video-on-demand presentation. FIG. 5 shows a timeline 500 of a live event and 6 livestream videos received during the event from 3 different spectators at the live event, and three natively-recorded video clips received either during or after the event has ended, submitted by a fourth spectator who attended the live event. FIG. 5 further shows two livestream video clips 502 and 504 submitted by spectator 1 covering two portions of the live event, livestream video clips 506 and 508 submitted by spectator 2 covering two different portions of the live event (but each livestream video clip 506 and 508 partially overlapping livestream video clips 502 and 504, respectively), and livestream video clips 510 and 512 submitted by spectator 3 covering another two, different portions of the live event (with livestream video clip 510 partially overlapping livestream and livestream video clip 502, while video clip 512 partially overlaps livestream video clip 504).

In this embodiment, at step 428, processor 300 may analyze each livestream video clip to determine where gaps may exist in coverage of an event and, in some embodiments, to determine "timing information" such as a start time and duration of each gap, an end time and duration of each gap or a start time and an end time of each gap. For example, referring to FIG. 5, an entire event is covered by the livestream video clips received from spectators 1-3, except for a gap in coverage 520 a little more than 1½ hours from the start of the live event. Gap 520 represents a portion in time of the live event where no livestream videos were received by video production server 114. Thus, a video-on-demand presentation of the event based solely on the livestream video clips would have an interruption at the start time of the gap, continuing until livestream video clip 504 begins.

In one embodiment, processor 300 stores a record in memory 302 associated with each gap in a video-on-demand presentation including the timing information associated with each gap. In a related embodiment, processor 300 does not store a record of each gap coverage in a video-on-demand presentation. Rather, processor 300 evaluates each natively-recorded video clip after it is received, determines timing information from the metadata associated with each natively-recorded video clip, and then compares the timing information of the natively-recorded video clip to each livestream video clip and any natively-recorded video clips in a video-on-demand presentation, to determine whether the natively-recorded video clip may fill a gap in the video-on-demand presentation.

In one embodiment, processor 300 only merges a natively-recorded video clip with livestream video clips when a duration of the natively-recorded video clip is less than a duration of a gap in coverage of an event as determined by an analysis of livestream video clips at or near the time that the natively-recorded video clip was recorded. In another embodiment, processor 300 merges natively-recorded video clips with livestream video clips by "truncating" the duration of a natively-recorded video clip when the duration of the natively-recorded video clip exceeds a respective gap in coverage of livestream video clips. For example, referring to FIG. 5 spectator 4 has submitted three natively-recorded video clips after an event has ended, shown as natively-recorded video clips 514, 516 and 518.

Processor determines that natively-recorded video clip 516 will fill gap 520, based on the gap timing information and the timing information associated with the natively-recorded video clip. In this example, natively-recorded video clip 516 completely fills gap 520. Processor 300 may truncate a duration of natively-recorded video clip 516 (either by clipping a start portion of natively-recorded video clip 516 that overlaps with an end portion of livestream video clip 502, clipping an end portion of natively-recorded video clip 516 that overlaps with a start portion of livestream video clip 504, or both, or by clipping the end portion of livestream video clip 502 and/or by clipping the start portion of livestream video clip 504), based on the timing information of natively-recorded video clip 516, livestream video clip 502 and livestream video clip 504.

At step 430, in one embodiment, processor 300 may limit the number of live stream and natively-recorded video clips of a video-on-demand presentation based on a predetermined number of clips associated with a number of predefined vantage points of venue 102, so that online viewers of video-on-demand presentations are not overwhelmed with tens or hundreds of video clips of any particular vantage point. For example, processor 300 may limit the number of video clips recorded from a "front row" of venue 102 to 5 and limit the number of video clips recorded from an "upper-level" vantage point of venue 102 to 2. In this example, when a natively-recorded video clip is received, processor 300 evaluates the metadata associated with the natively-recorded video clip to determine a vantage point where the natively-recorded video clip was recorded within venue 102. Processor 300 may then compare the vantage point of the natively-recorded video clip to the predefined vantage points, for example, the vantage points represented by icons 204-210 in FIG. 2. If processor 300 determines that the natively-recorded video clip was recorded at a "front row" vantage point and if the video-on-demand presentation comprises only 4 video clips associated with the "front row" vantage point, processor 300 adds the natively-recorded video clip to the video-on-demand presentation in association with the "front row" vantage point. If processor 300 determines that the "front row" vantage point contains 5 video clips when the natively-recorded video clip is received, processor 300 may either disregard or delete the natively-recorded video clip or it may store the natively-recorded video clip in memory 302 for possible later viewing.

In some embodiments, prior to automatically adding natively-recorded video clips to a video-on-demand presentation, processor 300 may evaluate each natively-recorded video clip to determine whether it meets or exceeds one or more predefined quality metrics, such as a minimum video quality, a minimum audio quality, a minimum level of visual obstruction with stage 118, a minimum ambient crowd noise, or was recorded at one or more desirable vantage points in venue 102. In a related embodiment, processor 300 evaluates a quality of natively-recorded video clips to determine if the quality of the natively-recorded video clips exceed a quality of either a livestream video clip or a natively-recorded video clip already present in the video-on-demand presentation, recorded at substantially the same time during a live event.

For example, processor 300 may evaluate a natively-recorded video clip to determine whether a video quality of the natively-recorded video clip meets or exceeds a predetermined video quality level. In this case, processor 300 may determine a video format, video resolution, frame rate, and/or a make and/or model of a content capture device that created the natively-recorded video clip. If the natively-recorded video clip meets or exceeds a minimum, predefined quality level of each and/or any types of video quality levels, processor 300 may include the natively-recorded video clip in the video-on-demand presentation. Of course, in this embodiment, processor 300 evaluates natively-recorded video clips and livestream video clips to determine their associated quality metric(s), and stores each clip in association with the determined quality metric(s).

As another example, processor 300 may evaluate a newly-received, natively-recorded video clip to determine whether a video quality of the new natively-recorded video clip meets or exceeds a quality of either an existing livestream video clip or a natively-recorded video clip of the video-on-demand presentation, recorded at the same event and at a substantially-similar or the same time during a live event, based on a comparison of timing information associated with new natively-recorded video clip, a previously-received livestream video clip or previously-received natively-recorded video clip. If a quality of the new natively-recorded video clip meets or exceeds the quality of either an existing livestream video clip or an existing natively-recorded video clip of the video-on-demand presentation, processor 300 may replace the video clip in the video-on-demand presentation with the natively-recorded video clip.

The methods or algorithms described in connection with the embodiments disclosed herein may be embodied directly in hardware or embodied in processor-readable instructions executed by a processor. The processor-readable instructions may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a spectator terminal. In the alternative, the processor and the storage medium may reside as discrete components.

Accordingly, an embodiment of the invention may comprise a computer-readable media embodying code or processor-readable instructions to implement the teachings, methods, processes, algorithms, steps and/or functions disclosed herein.

While the foregoing disclosure shows illustrative embodiments of the invention, it should be noted that various changes and modifications could be made herein without departing from the scope of the invention as defined by the appended claims. The functions, steps and/or actions of the method claims in accordance with the embodiments of the invention described herein need not be performed in any particular order. Furthermore, although elements of the invention may be described or claimed in the singular, the plural is contemplated unless limitation to the singular is explicitly stated.

What is claimed is:

1. A method, executed by an online video production server, for improving video production technology associated with the creation of synchronized, multi-view, online presentations, comprising:
creating an online video-on-demand presentation of a live event, comprising a plurality of livestream video clips of the live event received while the live event is occurring, the plurality of livestream video clips derived from a plurality of livestream videos streamed in real time by a plurality of livestream apps executed on a plurality of content capture devices, respectively;

determining timing information and a vantage point provided by the livestream app in association with each of the livestream video clips;

storing the timing information and the vantage point of each of the livestream video clips in association with a corresponding livestream video clip, respectively;

after creating the online video-on-demand presentation, receiving a natively-recorded video clip from a spectator who was present at the live event, the natively-recorded video clip created by native functionality of a first content capture device;

determining that the natively-recorded video clip is associated with the live event;

selecting a first video-on-demand presentation from a plurality of existing video-on-demand presentations associated with the live event;

determining a first vantage point where the natively-recorded video clip was recorded during the live event, the first vantage point provided by the livestream app in association with the natively-recorded video clip;

determining whether a gap in coverage of the live event exists in the video-on-demand presentation at the first vantage point comprising:
identifying all livestream video clips that were recorded at the first vantage point from the vantage point information stored in the memory; and
evaluating the timing information of each of the livestream video clips that were recorded at the first vantage point to determine when a discontinuation of coverage of the live event at the first vantage point is present;
and
merging the natively-recorded video clip with the first video-on-demand presentation when the natively-recorded video clip is associated with the live event and only when the gap in the coverage of the live event exists at the first vantage point in the video-on-demand presentation, resulting in a first updated video-on-demand presentation comprising both the livestream video clips and the natively-recorded video clip.

2. The method of claim 1, wherein determining that the natively-recorded video clip is associated with the live event comprises:
determining timing information associated with a time that the natively-recorded video clip was recorded;
determining a location where the natively-recorded video clip was recorded;
comparing the time and location associated with the natively-recorded video clip to times and locations of live events stored in a memory; and
determining that the natively-recorded video clip is associated with the live event when the time and location associated with the natively-recorded video clip substantially match a time and date of the live event.

3. The method of claim 1, further comprising:
evaluating the livestream video clips to determine a quality metric of each livestream video clip;
evaluating the natively-recorded video clip to determine a quality metric of the natively-recorded video clip;
determining timing information associated with a first livestream video clip;
determining timing information associated with the natively-recorded video clip; and
replacing the first livestream video clip with the natively-recorded video clip when the timing information associated with the natively-recorded video clip substantially matches the timing information associated with the first livestream video clip and the quality metric of the natively-recorded video clip exceeds the quality of the first livestream video clip.

4. A method, executed by an online video production server, for improving video production technology associated with the creation of synchronized, multi-view, online presentations, comprising:
creating an online video-on-demand presentation of a live event, comprising a plurality of livestream video clips of the live event received while the live event is occurring, the plurality of livestream video clips derived from a plurality of livestream videos streamed in real time by a plurality of livestream apps executed on a plurality of content capture devices, respectively;
after creating the online video-on-demand presentation, receiving a natively-recorded video clip from a spectator who was present at the live event, the natively-recorded video clip created by native functionality of a first content capture device;
determining that the natively-recorded video clip is associated with the live event;
selecting a first video-on-demand presentation from a plurality of existing video-on-demand presentations associated with the live event;
determining whether a gap in coverage of the live event exists in the first video-on-demand presentation;
determining an overlap between the natively-recorded video clip and the gap in coverage; and
merging the natively-recorded video clip between a first livestream video clip and a second livestream video clip that defines the gap in coverage of the first video-on-demand presentation when the natively-recorded video clip is associated with the live event, when the natively-recorded video clip overlaps at least some of a duration of the gap in coverage, and only when the gap in the coverage of the live event exists in the first video-on-demand presentation, resulting in a first updated video-on-demand presentation comprising both the livestream video clips and the natively-recorded video clip.

5. The method of claim 4, wherein merging the natively-recorded video clip comprises:
determining a duration of the gap;
determining that a duration of the natively-recorded video clip exceeds the duration of the gap;
truncating the natively-recorded video clip to produce a truncated video clip, the truncated video clip comprising a duration equal to the duration of the gap; and
merging the truncated video clip with the first and second livestream video clips to create a continuous video clip comprising the first livestream video clip, the truncated video clip and the second truncated video clip.

6. The method of claim 4, wherein determining that the natively-recorded video clip is associated with the live event comprises:
determining timing information associated with a time that the natively-recorded video clip was recorded;
determining a location where the natively-recorded video clip was recorded;
comparing the time and location associated with the natively-recorded video clip to times and locations of live events stored in a memory; and
determining that the natively-recorded video clip is associated with the live event when the time and location associated with the natively-recorded video clip substantially match a time and date of the live event.

7. The method of claim 4, wherein merging the natively-recorded video clip comprises:
determining the duration of the gap;
determining that a duration of the natively-recorded video clip exceeds the duration of the gap; and
truncating the natively-recorded video clip to produce a truncated video clip, the truncated video clip comprising a duration equal to the duration of the gap;
wherein merging the natively-recorded video clip between a first livestream video clip and a second livestream video clip comprises merging the truncated video clip with the first and second livestream video clips to create a continuous video clip comprising the first livestream video clip, the truncated video clip and the second truncated video clip.

8. The method of claim 4, further comprising:
determining a first vantage point where the natively-recorded video clip was recorded during the live event, the first vantage point provided by the livestream app in association with the natively-recorded video clip; and
determining that the gap in coverage exists in the video-on-demand presentation at a second vantage point;
wherein merging the natively-recorded video clip between a first livestream video clip and a second livestream video clip comprises merging the natively-recorded video clip into the gap in coverage of the video-on-demand presentation when the first vantage point and the second vantage point are the same.

9. The method of claim 4, further comprising:
evaluating the livestream video clips to determine a quality metric of each livestream video clip;
evaluating the natively-recorded video clip to determine a quality metric of the natively-recorded video clip;
determining timing information associated with a first livestream video clip;
determining timing information associated with the natively-recorded video clip; and
replacing the first livestream video clip with the natively-recorded video clip when the timing information associated with the natively-recorded video clip substantially matches the timing information associated with the first livestream video clip and the quality metric of the natively-recorded video clip exceeds the quality of the first livestream video clip.

10. A system for improving synchronized, multi-view, online presentations, comprising:
a plurality of content capture devices configured to create natively-recorded video clips of a live event, each natively-recorded video clip created by native functionality of the first content capture device, each of the natively-recorded video clips comprising a natively-generated location and a natively-generated time when each natively-recorded video clip was recorded, to execute a livestream app configured to stream livestream videos of the live event to the video production server and further configured to enable a user to select a first natively-recorded video clip and upload the first natively-recorded video clip to the video production server; and
the video production server configured to create online video-on-demand presentations of a plurality of live events, including a first video-on-demand presentation based on the live event, the first video-on-demand presentation comprising a plurality livestream video clips created from the livestream videos of the live event, to determine timing information and a vantage point provided by the livestream app in association with each of the livestream videos, to store the timing information and the vantage point of each of the livestream videos in association with a corresponding livestream video clip, respectively, to determine that the first natively-recorded video clip is associated with the live event, to determine a first vantage point where the first natively-recorded video clip was recorded during the live event, the first vantage point provided by the livestream app in association with the natively-recorded video clip, to determine whether a gap in coverage of the live event exists in the first video-on-demand presentation at the first vantage point associated with the first natively-recorded video clip by configuring the video production server to identify all livestream video clips that were recorded at the first vantage point, and evaluate the timing information of each of the livestream video clips that were recorded at the first vantage point to determine when a discontinuation of coverage of the live event at the first vantage point is present, and
to merge the first natively-recorded video clip with the first video-on-demand presentation when the first natively-recorded video clip is associated with the live event and only when the gap in the coverage of the live event exists at the first vantage point in the video-on-demand presentation, resulting in an updated video-on-demand presentation comprising both the livestream video clips and the first natively-recorded video clip.

11. The system of claim 10, wherein the video production server is configured to determine that the first natively-recorded video clip is associated with the live event by configuring the video production server to determine the natively-generated time that the first natively-recorded video clip was recorded, to determine the natively-generated location where the first natively-recorded video clip was recorded, compare the natively-generated time and the natively-generated location associated with the first natively-recorded video clip to times and locations of live events stored in a memory, and determine that the first natively-recorded video clip is associated with the live event when the natively-generated time and the natively-generated location associated with the first natively-recorded video clip substantially match a time and date of the live event.

12. The system of claim 10, wherein the video production server is further configured to evaluate the livestream video clips to determine a quality metric of each livestream video clip, evaluate the first natively-recorded video clip to determine a quality metric of the natively-recorded video clip, determine timing information of a first livestream video clip, determine timing information of the natively-recorded video clip, and replace the first livestream video clip with the first natively-recorded video clip when the timing information associated with first natively-recorded video clip substantially matches the timing information associated with the first livestream video clip and the quality metric of the first natively-recorded video clip exceeds the quality of the first livestream video clip.

13. A system for improving synchronized, multi-view, online presentations, comprising:
a plurality of content capture devices configured to create natively-recorded video clips of a live event, each natively-recorded video clip created by native functionality of the first content capture device, each of the natively-recorded video clips comprising a natively-generated location and a a natively-generated time when each natively-recorded video clip was recorded, to execute a livestream app configured to stream livestream videos of the live event to the video production server and further configured to enable a user to select a first natively-recorded video clip and upload the first natively-recorded video clip to the video production server; and the video production server configured to create online video-on-demand presentations of a plurality of live events, including a first video-on-demand presentation based on the live event, the video-on-demand presentation comprising a plurality livestream video clips created from the livestream videos of the live event, to determine that a first natively-recorded video clip is associated with the live event, to determine an association between the first natively-recorded video clip and the live event, to determine whether a gap in coverage of the live event exists in the first video-on-demand presentation, to determine an overlap between the first natively-recorded video clip and the gap in coverage, and to merge the first natively-recorded video clip with the first video-on-demand presentation when the first natively-recorded video clip is associated with the live event by merging the first natively-recorded video clip between a first livestream video clip and a second livestream video clip that defines the gap in coverage when the first natively-recorded video clip overlaps at least some of the duration of the gap in coverage, resulting in an updated video-on-demand presentation comprising both the livestream video clips and the first natively-recorded video clip.

14. The system of claim 13, wherein the video production server is configured to merge the first natively-recorded video clip by configuring the video production server to determine a duration of the gap, determine that a duration of the first natively-recorded video clip exceeds the duration of the gap, truncate the first natively-recorded video clip to produce a truncated video clip, the truncated video clip comprising a duration equal to the duration of the gap and merge the truncated video clip with the first and second livestream video clips to create a continuous video clip comprising the first livestream video clip, the truncated video clip and the second truncated video clip.

15. The system of claim 13, wherein the video production server is configured to determine that the first natively-recorded video clip is associated with the live event by configuring the video production server to determine the natively-generated location and the natively-generated time of the first natively-generated video clip, to compare the natively-generated time and the natively-generated location associated with the first natively-recorded video clip to times and locations of live events stored in a memory, and to determine that the first natively-recorded video clip is associated with the live event when the time and location associated with the first natively-recorded video clip substantially match a time and date of the live event.

16. The system of claim 13, wherein the video production server is further configured to store supplemental information received from the livestream app in association with each of the livestream video clips, respectively, the supplemental information comprising timing information associated with each of the livestream video clips, wherein the video production server is configured to determine whether the gap in coverage of the live event exists in the first video-on-demand presentation after the live event has ended by configuring the video production server to analyze the timing information of each of the livestream video clips to determine when at least a portion of the live event is not represented by at least one of the livestream video clips.

17. The system of claim 13, wherein the video production server is further configured to determine a first vantage point where the first natively-recorded video clip was recorded during the live event, the first vantage point provided by the livestream app in association with the natively-recorded video clip, to determine that the gap in coverage exists in the video-on-demand presentation at a second vantage point, wherein merging the first natively-recorded video clip with the first video-on-demand presentation comprises merging the first natively-recorded video clip into the gap in coverage of the video-on-demand presentation when the first vantage point and the second vantage point are the same.

18. The system of claim 13, wherein the video production server is further configured to evaluate the livestream video clips to determine a quality metric of each livestream video clip, to evaluate the first natively-recorded video clip to determine a quality metric of the natively-recorded video clip, to determine timing information of a first livestream video clip, to determine timing information of the natively-recorded video clip, and to replace the first livestream video clip with the first natively-recorded video clip when the timing information associated with first natively-recorded video clip substantially matches the timing information associated with the first livestream video clip and the quality metric of the first natively-recorded video clip exceeds the quality of the first livestream video clip.

* * * * *